No. 669,942. Patented Mar. 12, 1901.
F. M. GILBERT & G. K. WHEELER.
SYSTEM FOR GENERATING AND DISTRIBUTING ELECTRIC CURRENTS.
(Application filed Dec. 17, 1898.)
(No Model.)
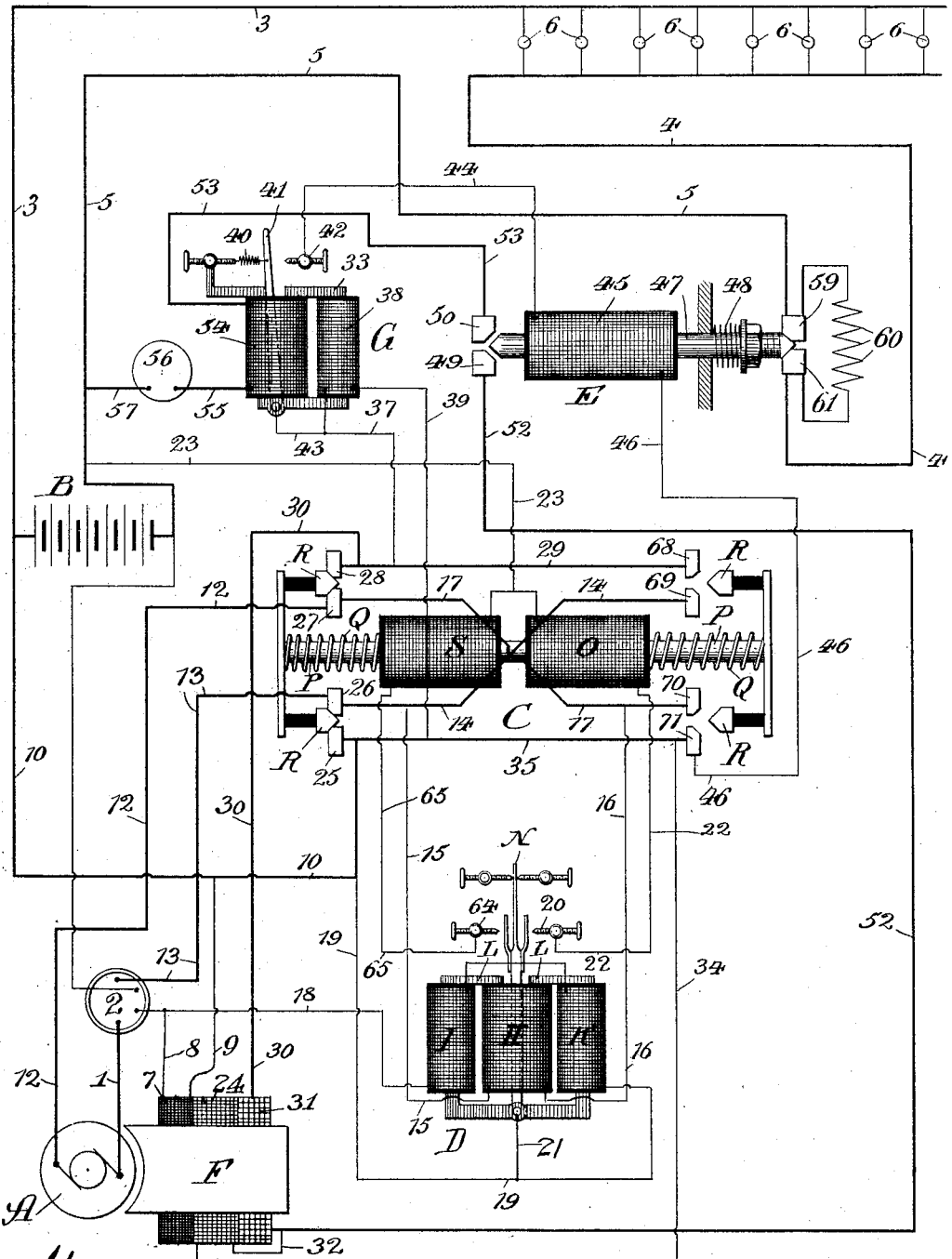
Witnesses:
Inventors:
Franklin M. Gilbert,
George K. Wheeler.

UNITED STATES PATENT OFFICE.

FRANKLIN M. GILBERT, OF ST. PAUL, MINNESOTA, AND GEORGE K. WHEELER, OF TOPEKA, KANSAS, ASSIGNORS TO THE ELECTRIC AXLE LIGHT & POWER COMPANY, OF NEW YORK, N. Y.

SYSTEM FOR GENERATING AND DISTRIBUTING ELECTRIC CURRENTS.

SPECIFICATION forming part of Letters Patent No. 669,942, dated March 12, 1901.

Application filed December 17, 1898. Serial No. 699,575. (No model.)

*To all whom it may concern:*

Be it known that we, FRANKLIN M. GILBERT, of St. Paul, Ramsey county, Minnesota, and GEORGE K. WHEELER, of Topeka, Shawnee county, Kansas, citizens of the United States, have invented a certain new and useful Improvement in Systems for Generating and Distributing Electric Currents, of which the following is a specification.

The invention relates to that class of systems of electrical distributers in which lights and other translating devices are to be supplied with current at a practically constant voltage regardless of the speed of the generator or its direction of rotation—as, for instance, in the lighting of railroad-cars. In such a system energy must be on hand even if the cars stop, and therefore our invention combines such elements to meet the requirements.

In practicing our invention we use a suitable dynamo, a storage battery, a circuit-controller, and a reversing-switch or circuit-selector in such manner as will more fully be described below.

The object of the invention is to provide a simple, economical, and efficient current generating and distributing system with means introducing the dynamo-current in the desired manner into the circuit and opening and closing the dynamo or generating circuit at the proper voltage.

Further objects of the invention will appear from an inspection of the following description and claims.

The invention consists principally in the combination of a dynamo, a secondary battery, a reversing-switch or circuit-selector interposed between the primary and secondary sources, a controlling device energized by both sources actuating the reversing-switch and causing the dynamo-current to enter the battery and main-line or supply circuit always in the same direction, a switch in the dynamo-circuit for controlling its connection with the battery and main or supply circuit, and additional means for controlling this switch.

The invention consists, further, in the features, combinations, and details of construction hereinafter described and claimed.

The accompanying drawing shows the organization in diagram.

Where a dynamo is used in connection with a storage battery to jointly supply a circuit containing consumption devices—such, for instance, as incandescent lamps—or to charge the battery simultaneously with such current-supply to the translating devices, it is essential that the dynamo-pressure should be above that of the battery, and when the voltage of the dynamo falls below that of the battery that the dynamo be promptly disconnected to prevent injury to the same, in that the dynamo would be reversed and operated by the battery as a motor, causing waste of stored energy if not destruction of the battery. It is therefore desirable to combine and organize mechanisms to close the dynamo-circuit when the generator has built up to the desired potential and to so connect its current to the battery and main line that it assists the battery-current in supplying the translating devices. Our invention, therefore, is intended to provide means, first, for closing the dynamo-circuit at a predetermined voltage and to open the same when the dynamo-pressure for any reason whatever falls below that of the battery, and, second, for switching the dynamo-current onto the main line after giving it the proper direction of flow relatively to the battery.

Referring now to the diagram, A is the armature of a compound-wound generator; B, a storage battery; C, an automatic reversing-switch; D, a polarized relay; E, an electromagnetic switch for controlling the dynamo-circuit; F, the field-magnet of the compound-wound dynamo; G, a second relay or polarized magnet. In this organization the dynamo supplies current only when its speed is such as to produce a voltage above that of the battery. In the diagram as shown the battery B supplies current to translating devices 6 over the main-circuit wires 3, 4, and 5, the speed of the dynamo being below normal. The switch 2 being normally closed places the armature A onto the terminals of the reversing-switch C and also closes the high-resistance shunt-winding 7 in circuit with battery B by wires 10, 9, and 8, switch 2, wire 11, polarizing-magnet F, and generating current in armature A at a comparatively low speed. As the dynamo-potential builds up with increasing speed current flows from A, over wire 1, switch 2, and wires 13 14 15, to the central coil H of the polarized relay D, the current completing its circuit over wires 16, 17, and 12 to the dynamo. The coils I and K of the relay are in series with one another and connected to the battery B through wire 18, switch 2, wire 11, and wires 19 and 10, respectively. The pole-shoes L L of core M are therefore polarized, and the flow of current through coil H magnetizes armature N, which is attracted into contact with terminal 20, thereby energizing coil O of the reversing-switch. Current flows from battery B, over wires 10 19 21, to relay-armature N, over wires 20 22 to coil O, wire 23, main line 5, to battery. The energized coil O attracts core P to the right against the tension of spring Q. The insulated contact-plugs R establish contact with terminals 25 26 and 27 28. The initial magnetization of the dynamo-field F, caused by coil 7, is now raised to its normal strength. The circuit just established energizes the main shunt-winding. 26 and 27 are the dynamo-terminals at the reversing-switch, and current will flow from and through terminal 27, plug R, contact 28, wires 29 and 30, series coil 31, wire 32, to main shunt-coil 24, over 34 to wire 35, over contact 25 and plug R back to the dynamo-terminal 26. The wire contact-plugs R R close still another circuit—namely, that of the electromagnet or relay G, whose coil 38 is placed in circuit across the generator by conductors 37 39. Its core and pole-shoe 33 become magnetized and attract armature-lever 41 against tension of spring 40 to establish contact with terminal 42. As lever 41 is connected by wire 43 to conductor 37, it closes the circuit of coil 45. This local circuit starts from dynamo-terminal 27, contact-plug R, contact 28, wires 29, 37, and 43, lever 41, contact 42, wire 44, coil 45, wires 46 and 35, contact 25, plug R, and terminal 26. The coil 45 attracts its core 47 against the tension of spring 48 to the left, closing contacts 49 and 50, thereby switching the generator A onto the main line 3 5. The current flows from armature A, over wire 1, switch 2, wire 13, terminal 26, plug R, contact 25, and wire 10, to battery B and main line 3. From this point the battery and dynamo external circuit are identical over main line 3, lamps 6, wire 4, contact 61, resistance 60, contact 59, and main line 5 back to the other side of the battery. A part of the energy flows through the battery itself and the remainder over the just-described external circuit 3, 4, and 5. The dynamo return-circuit is over main line 5, wire 57, ammeter 56, wire 55, spool 54, wire 53, contacts 50 49, wire 52, over series coil 31, wire 30, contact 28, plug R, terminal 27, and wire 12 back to the armature.

To illustrate the usefulness of our invention, it may be explained as follows: If a dynamo be driven at very irregular speeds—as, for instance, if it receive its driving power from the axle of a moving car which may be apt to travel backward or forward and whose speed may be low for a considerable time—we prefer to employ a compound-wound dynamo and provide the same with two shunt-windings, one of which is connected to the battery-circuit by means of switch 2, thereby magnetizing field-magnet F, so that even at comparatively low speed it is adapted to produce a current more than strong enough to operate the relay D and reversing-switch C, thereby connecting the main shunt-winding 24 across the dynamo-terminals, enabling the armature to rapidly build up the desired voltage as the car speed approaches normal or any predetermined speed. Depending on the ampere-turns given this shunt-winding, the series winding may be used in any well-known way either to assist or to oppose the main shunt-winding.

It will be seen from the foregoing and an examination of the drawings that if the shunt-circuit at normal maximum speed does not produce a voltage sufficient for the battery the series winding is connected to add its magnetizing effect to that of the shunt-windings, in the other case being connected in opposition. As soon the voltage is high enough to send a given current through relay-spool 38 it operates dynamo-switch E, which simultaneously connects the dynamo with the line and inserts resistance 60 into the lamp-circuit. Should the dynamo speed fall and therefore also its voltage, the electromagnetic cut-out or relay G becomes too weak to maintain the connection between armature-lever 41 and contact 42, the armature-lever 41 flies back, dynamo-switch coil 45 is deënergized, and the core 47 is forced back by spring 48 into its original position, opening connection between contact-terminals 49 and 50, and thereby disconnecting the dynamo from the battery and main circuit. Below the predetermined speed or when the cars stop the battery alone supplies the external circuit, whose main conductors are 3, 4, and 5, which can readily be followed on the diagram.

If the direction of the car travel be reversed, the dynamo is turned in the opposite direction. To have the current pass to the battery in the required direction, it passes first the automatic reversing-switch or circuit-selector C, which reverses the connection to the line by the following operation: Current leaves the dynamo over wire 12, terminal 27, reversing bar or wire 17, wire 16 to relay D, the center spool of which, H, the current enters in the opposite direction from that first described over wire 15, reversing bar or wire 14, wire 13, switch 2, and wire 1 to generator. The armature N of relay D is now attracted to the left, the polarity of coils I and K remaining unchanged. The current flows from battery B over wires 10 19 21, relay-armature N, contact 64, wire 65, spool S of reversing-switch, over wires 23 and 5 back to the battery. Solenoid S attracts the core P to the left, closing contacts 68 69 70 71. (As the core P has the contact-plugs R rigidly mounted at both ends, connections can be established on one side only. The first position describes connections between contacts 25 26 27 28, while those on the other end are shown open. When neither coil O nor S is energized, contacts R are equally distant from terminals 25 26 27 28 68 69 70 71. When coil S is energized, terminals 68 69 70 71 are closed, while contacts R on the left side move farther away from terminals 25 26 27 28.) By closing the connections on the right the main shunt-winding of dynamo is closed through wire 12, reversing bar or wire 17, contacts 70 71, plug R, bar or wire 35, wire 34, main shunt-coil 24, wire 32, series coil 31, wires 30 29, contacts 68 69, plug R, reversing-bar 14, terminal 26, wire 13, switch 2, and wire 1 back to dynamo. The dynamo is again energized by the main shunt-winding 24, which rapidly builds up, magnetizes coil 38 of magnet G in the same direction as before, being connected across the circuit after the reversing is accomplished, actuates dynamo-switch E, switching the dynamo onto the battery-circuit. The relay-current G is as follows: through armature A, wire 12, reversing wire or bar 17, contacts 70 71, plug R, bar 35, wire 39, coil 38 of magnet or relay G, wire 37, contacts 68 69, plug R, reversing bar or wire 14, wire 13, switch 2, and wire 1 to armature. The coil 45 is placed across the dynamo-terminals as follows: the terminal 68, bar or wire 29, wires 37 43, lever 41, contact 42, wire 44, coil 45, wire 46 to terminal 71. The dynamo-circuit can be traced by starting with armature A, wire 12, reversing bar or wire 17, contacts 70 71, plug R, bar or wire 35, wire 10 to battery B and external circuit main line 3. From this point the battery and dynamo external circuit are identical over main line 3, lamps 6, wire 4, terminal 61, resistance 60, terminal 59, and wire 5 back to the other side of the battery. A part of the energy flows through the battery itself and the remainder after the just-described external circuit. The dynamo return-circuit is over main line 5, wire 57, ammeter 56, wire 55, spool 54, wire 53, contacts 50 49, wire 52 over series coil 31, wires 30 29, contacts 68 69, plug R, reversing-bar 14, wire 13, switch 2, and wire 1 back to armature.

When the speed of the cars falls below a predetermined point, the dynamo speed falls off below the critical or predetermined point and magnet G cannot control armature-lever 41, which is pulled back by spring 40. In this condition dynamo-switch coil 45 loses its magnetism and core 47 short-circuits resistance 60, disconnecting at the same time the dynamo from the battery-circuit by opening it between contacts 49 and 50.

While we have described our invention with more or less minuteness as regards details and as being embodied in certain precise forms, we do not desire to be limited, as it is susceptible of a number of modifications entirely within the scope of our invention. On the contrary, we contemplate all proper changes in form, construction, and arrangement, the omission of immaterial elements, and the substitution of equivalents, as circumstances may suggest or necessity render expedient.

We claim—

1. In a system of electrical distribution, the combination with a consumption-circuit, a dynamo, and secondary battery connected therewith, a resistance interposed in said main line, and an automatic switch for simultaneously including in said main-line circuit said dynamo and said resistance, of an automatic rectifier interposed between said dynamo and said secondary battery, consisting of a polarized relay having one winding in circuit with the secondary battery and another in circuit with the dynamo, an electromagnetic reversing-switch controlled by said polarized relay, a second relay actuated by said reversing-switch, and an electromagnetic dynamo-circuit-controlling switch actuated by the last-named relay, substantially as described.

2. An electric circuit containing translating devices, a pole-changer, a dynamo, a storage battery, a dynamo circuit-controller interposed between the pole-changer and said electric circuit, an energizing-winding in shunt connection with said dynamo and battery, a second winding in shunt to the dynamo-terminals, a resistance forming part of said circuit, and contact-terminals within the path of said circuit-controllers to actuate simultaneously said dynamo and said resistance, substantially as described.

3. In a system for generating and distributing electric current, the combination of a dynamo, a set of secondary batteries, a current-rectifier comprising a double-winding solenoid provided with a winding at or near each end and two pairs of contacts adjacent to each end of the solenoid and a core extending through the solenoid, a polarized relay electrically connected with the batteries and dynamo and provided with an armature adapted to be operated by the magnetic action of the relay and make or break electrical connections with the winding at either end of the solenoid and batteries to operate the core, a main supply-line connected with the batteries, a potential-switch comprising a solenoid provided with a winding electrically connected with the dynamo, a core extending through the same, a pair of contacts at or near both ends of the core for establishing or opening circuit connection, a polarized relay electrically connected with the dynamo and interposed between the dynamo and solenoid of the potential-switch and provided with an armature for acting when the dynamo potential rises to a predetermined point and close the circuit between the dynamo and the winding of the main-switch solenoid and to operate its core and break such circuit when the dynamo potential falls below a predetermined point, substantially as described.

4. In an electric system of distribution, the combination of a secondary battery, a dynamo, a current-rectifier comprising a double solenoid, a set of circuit-contacts applied near each end of said double solenoid, a core for said solenoid engaging with either set of circuit-contacts, a relay having two energizing-circuits, one connected to the battery and the other to the dynamo, an armature for establishing circuit connections influenced by the two energizing-circuits of said relay, a main supply-line connected with the secondary battery, an electromagnetic switch connected to the dynamo through the rectifier-circuit, contacts at either end of such switch, a movable core for the same for energizing said contacts, and an electromagnet of constant polarity or polarized relay actuating said potential-switch, substantially as described.

5. In a system for generating and distributing electric currents, the combination of a compound-wound dynamo provided with a high-resistance shunt, a series and a main shunt coil, a secondary battery electrically connected with said coils, a current-rectifier comprising a double solenoid, two sets of contacts near each end of said solenoid connected with the dynamo, a core for said solenoid for connecting either set of contacts, a polarized relay having a circuit connected to the battery and another to the dynamo, an armature forming part of said relay for controlling the current-flow through one or the other coil of said double solenoid, an electromagnetic switch connected through the rectifier with the dynamo, circuit-terminals within the path of said switch, circuit-closing contacts carried by said switch, a second relay in circuit with said dynamo actuating said switch connected between said dynamo and said switch, substantially as described.

6. In a system for generating and distributing electric currents, the combination of a compound-wound dynamo having a supplemental high-resistance shunt-winding, a series and a main shunt winding, a secondary battery electrically connected with said dynamo, a current-rectifier having two energizing-coils, circuit-terminals near each end of said energizing-coils, a core for said rectifier carrying contacts for engaging with said circuit-terminals, means for holding said core normally disengaged from said circuit-terminals, a polarized relay actuating said rectifier by means of a shunt-current from the dynamo, a potential-switch having a winding in shunt-circuit through said rectifier to the dynamo, circuit-terminals near the said winding, a core actuating a contact for engaging with said circuit-terminals, and an electromagnet or polarized relay also connected in parallel to the dynamo for actuating said potential-switch, substantially as described.

7. The combination of a main circuit containing a translating device, a storage battery connected across said circuit, a subcircuit also connected across said main line containing a dynamo, a circuit-reversing switch and a subcircuit-closer, three magnet-windings on said dynamo, one being included in series with said main circuit, the other two in shunt connection to said main circuit, and means for controlling the direction of current-flow of one of the latter by said reversing-switch, substantially as described.

FRANKLIN M. GILBERT.
GEORGE K. WHEELER.

Witnesses to the signature of Franklin M. Gilbert:
    ALEX. R. SPEEL,
    CHAS. CONRADIS.

Witnesses to the signature of George K. Wheeler:
    GEO. C. F. ROBERTS,
    J. B. SIAS.